(No Model.)
L. MORGAN.
CYLINDER FOR GRAIN SCOURERS.
No. 263,195. Patented Aug. 22, 1882.
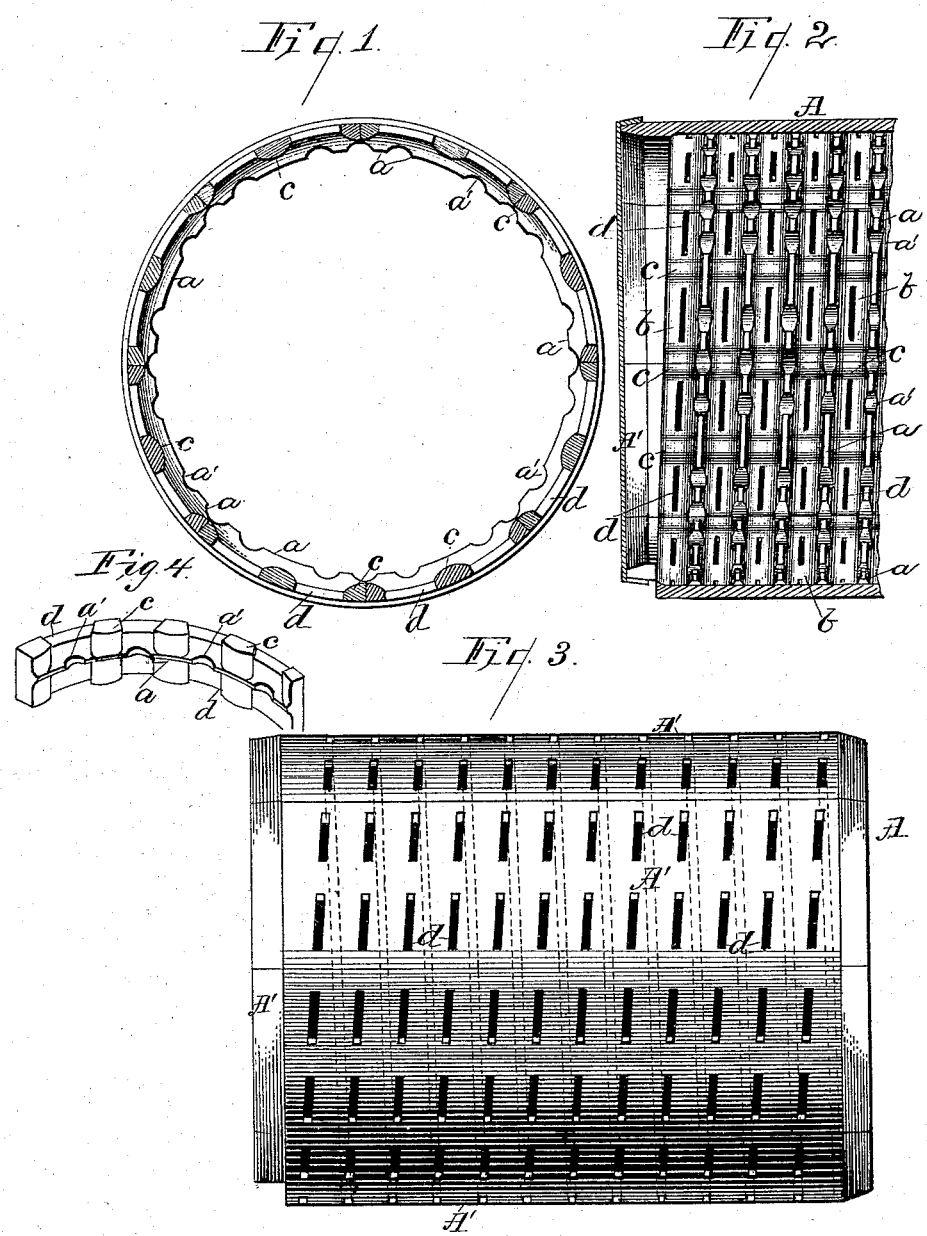

UNITED STATES PATENT OFFICE.

LYMAN MORGAN, OF PORT WASHINGTON, WISCONSIN.

CYLINDER FOR GRAIN-SCOURERS.

SPECIFICATION forming part of Letters Patent No. 263,195, dated August 22, 1882.

Application filed April 8, 1882. (No model.)

*To all whom it may concern:*

Be it known that I, LYMAN MORGAN, of Port Washington, in the county of Ozaukee, and in the State of Wisconsin, have invented certain new and useful Improvements in Cylinders for Grain-Scourers; and I do hereby declare that the following is a full, clear, and exact description thereof.

My invention relates to smut-machine and wheat-polishing cases, and is designed as an improvement on the cases as made under my patent reissued September 2, 1879, in two divisions, numbered 8,878 and 8,879.

In the drawings, Figure 1 is a transverse section of my device. Figure 2 is a longitudinal section with one end broken away. Fig. 3 is a side view, and Fig. 4 is a detail.

A smut-machine generally consists of a cylinder or case, which may be either vertical or horizontal, and beaters arranged to revolve inside of the cylinder or case and catch the grain and throw it against the sides of the case with such force that its contact with the staves that compose the case will rid it of smut and any other foreign substances that may have adhered to it before, and the staves are perforated or slotted to permit the foreign matter to be blown out by the current of air created by the beaters.

My device, as set forth in the reissues before referred to, was designed for either an upright or horizontal machine; but I found by practice and experiment that as the ridges and indentations in the case were made to follow each other in perfect circles in a horizontal machine the grain would not pass through the machine properly, and while a portion of the wheat might remain in the case too long a portion would go through without being sufficiently scoured. I also found that the indentations in my former machine were insufficient in their action upon the grain. Hence I now cast the staves A' of my case A with a series of wedge-shaped ridges, $a$, so that when the staves are put together they extend entirely around the case and leave troughs $b$ between them. I also cast the staves with a series of raised portions, $c$, that extend lengthwise of the case, and while not as high as the ridges $a$ they are still broad enough to extend from the end of one of the slots $d$ to another. The ridges $c$ are rounded off on top, and the ridges $a$ are notched, as shown at $a'$. In each stave A' the ridges are slightly inclined from a right angle to the length of the stave, so that when they are put together to form a case they will form a spiral trough beginning at the mouth of the case and terminating at the lowest portion of its exit end, and therefore when the beater is working the spiral trough will guide the wheat along toward its exit as it tumbles about over the ridges $a$, through the notches in them, and over the raised portions $c$, coming out finally completely and evenly cleaned. By my present construction, while there are no sharp corners to cut the wheat or tear it, there are no plain surfaces on the inside of the case, and the wheat will be continually scoured from the time it enters the case until it leaves it. This spiral form of trough is only necessary for horizontal cases, and therefore I may dispense with it in vertical cases; and instead of staves extending from one end, I may make my case in rings, a segment of one of which is shown in Fig. 4. These rings are just wide enough to take in one-half of a slot, $d$, on each edge, and therefore the chilling of the slots may be accomplished more easily than when they are in the interior of a stave, as in my patent before referred to.

What I claim as my invention, and desire to secure by Letters Patent, is—

1. A cylinder for grain-scourers, composed of staves cast with wedge-shaped ridges extending spirally around its interior, and rounded ridges falling short in height of the wedge-shaped ridges and running lengthwise of the cylinder, as set forth.

2. A cylinder for grain-scourers, having ridges $a$ and $c$, that run in opposite directions to each other and encompass slots between them, as set forth.

3. A cylinder for grain-scourers, cast with a series of ridges, $a$, notched at $a'$, raised portions $c$, and slots $d$, as set forth.

4. A cylinder for grain-scourers, having ridges that extend spirally around its interior and form a spiral trough between them, and having slots extending through the troughs, as set forth.

In testimony that I claim the foregoing I have hereunto set my hand on this 31st day of March, 1882, in the presence of two witnesses.

LYMAN MORGAN.

Witnesses:
S. S. STOUT.
HAROLD G. UNDERWOOD.